Sept. 2, 1952  G. A. LYON  2,609,245
WHEEL COVER
Filed March 29, 1947

Inventor
GEORGE ALBERT LYON.
by
Attys.

Patented Sept. 2, 1952

2,609,245

UNITED STATES PATENT OFFICE 2,609,245

WHEEL COVER

George Albert Lyon, Detroit, Mich.

Application March 29, 1947, Serial No. 738,079

11 Claims. (Cl. 301—37)

1

This invention is concerned with an improved wheel structure and more particularly relates to an improved ornamental and protective cover construction for vehicle wheels.

It is an important object of the present invention to provide an improved wheel structure and cover therefor on the order of that disclosed in my issued Patent No. 2,397,024, dated March 19, 1946.

Another important object of the present invention is to provide in a vehicle wheel structure improved retaining means for maintaining a multi-cover assembly in detachable relation thereto.

Another object of the invention is to provide an improved multi-part cover construction for vehicle wheels and improved means whereby the components of the cover are effectively held in assembly on the wheel but are independently detachable and replaceable.

Still another object of the invention is to provide a wheel structure including a multi-part wheel cover and novel means whereby the cover components are retained in assembled relation or independently by the same retaining means.

A further object of the invention is to provide improved wheel structure including a novel composite cover arrangement and retaining means therefor whereby the cover components are independently attachable and detachable in snap-on pry-off relationship and are protected against pry-off damage.

Yet another object of the invention is to provide improved means in a wheel structure and cover assembly wherein composite cover members are independently attachable and detachable in snap-on pry-off relationship to the wheel and one of the cover members serves as a pry-off fulcrum in detachment of the other cover component, and the wheel structure backs up the fulcrum portion of the one cover member.

According to the general features of the invention, there is provided a wheel structure including multi-flange tire rim and wheel body members, one of the wheel members having resilient cover retaining means thereon, the wheel body member having an annular groove adjacent to the juncture with the tire rim member, and a cover assembly comprising an inner circular cover member having a radially outer marginal portion thereof formed to provide a generally radially outwardly and axially outwardly opening groove and a coincident generally axially inwardly extending annular rib seated in the groove of the wheel body with the adjacent radially inner portion of said outer marginal portion of the inner cover mem-

2 ber resting against the wheel body, and an outer cover member for concealing the tire rim and having an inner marginal rearwardly turned bead seated in said groove of the inner cover member and engaged by the retaining means on the wheel to hold the cover members in assembly, said radially inner area of the outer margin of the inner cover member serving as a pry-off fulcrum for a pry-off tool employed to detach the outer cover member.

Another feature of the invention resides in the provision of a composite wheel cover for a wheel including a tire rim and a body part, the cover including a tire rim concealing trim ring member and an inner cover member, the inner cover member having the radially outer margin thereof formed to provide a generally axially outwardly opening groove and the trim ring member having the inner margin thereof formed to rest in axially detachable assembly within said groove and adapted to be engaged by resilient retaining means carried by the wheel behind the trim ring member, the trim ring member being adapted to be pried free from the assembly by engagement of either the outer margin or the inner margin thereof by a pry-off tool.

It is another feature of the invention to provide a composite cover assembly including an outer cover member and an inner circular cover member formed with a groove to receive the outer cover member in assembly, the inner cover member being formed with a pry-off flange extending generally radially outwardly beyond the groove.

According to another feature of the invention, the pry-off flange on the inner cover member is formed with notches for receiving retaining spring clips on the wheel for retaining the cover members in assembly and at least the inner cover member against rotation.

Other objects, features and advantages of the present invention will be readily apparent from the following detailed description of a preferred embodiment thereof taken in conjunction with the accompanying drawings, in which.

As shown on the drawings.

Figure 2:
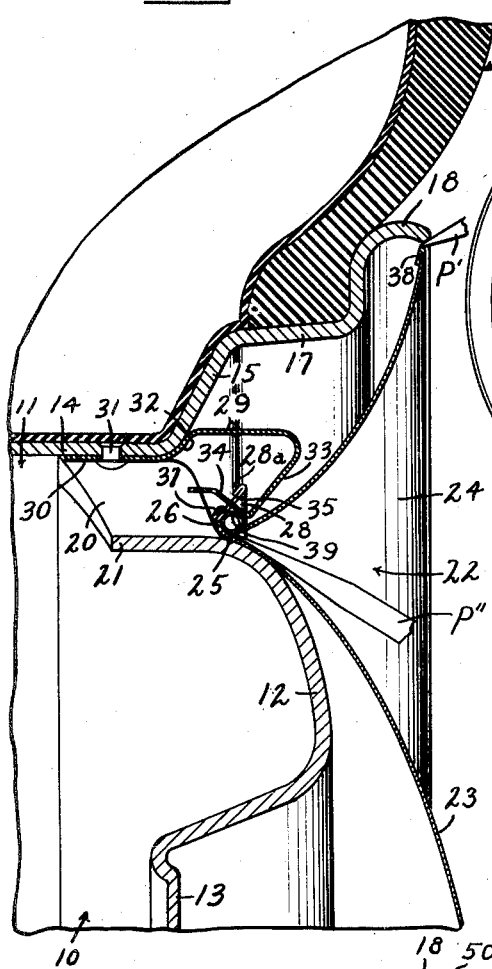
Figure 2 is a radial sectional view on a large scale taken substantially on the line II—II of Figure 1.

A wheel structure in which the present invention is adapted to be embodied comprises a wheel body 10 and a tire rim 11 both of which may, according to current practice, be made from suitable guage sheet metal, the wheel body being formed as a stamping and the tire rim being formed as a rolled section.

The wheel body 10 is preferably formed with a generally axially outwardly extending annular reinforcing bulge 12 defining a central axially inwardly depressed bolt-on flange portion 13 by which the wheel is adapted to be secured in the usual manner to a part of the axle of a vehicle (not shown).

The tire rim 11 may be of the multi-flanged type having a base flange 14 which is adapted to be secured in any suitable fashion to the outer margin of the wheel body 10. Extending generally radially and axially outwardly from the base flange 14 is an inner side flange 15 which joins a generally radially outwardly extending intermediate flange 17 having integral therewith an axially outer marginal terminal flange 18. The flanges of the tire rim afford a stepped, drop center seat for a pneumatic tire and tube assembly 19.

At the juncture of the wheel body 10 and the tire rim 11 may be provided openings for ventilation purposes, identified at 20, and formed by inset flange portions 21 of the outer margin of the wheel body 10. There may be any preferred plurality of the ventilation openings 20, located symmetrically about the wheel body 10, the usual number being four.

In order to cover the relatively unattractive outer side of the wheel and afford a protective closure and ornamental appearance therefor, an improved cover assembly 22 is provided. This cover assembly comprises a circular inner cover member 23 and a circular outer cover member 24.

The inner cover member 23 is preferably formed in simulation of a hub cap and is of a diameter to extend in concealing relation to the wheel body 10 to within a short distance of the juncture of the wheel body with the tire rim. At its margin the inner cover member 23 engages in nested relation with the wheel body 10 at the radially outer side of the reinforcing bulge 12 within an annular groove 25 which opens generally radially and axially outwardly in the wheel body preferably substantially annularly coincident with the wheel opening inset flange portions 21. For this purpose the inner cover member 23 is marginally formed with an annular generally radially inwardly extending rib 26 which seats in the wheel body groove 25 and defines a generally axialy outwardly opening groove 27 with the area of the cover member 23 immediately radially inwardly from the groove 27 resting against the radially outer side of the nose bulge 12.

At the radially outer side of the groove 27, the margin of the inner cover margin extends in a generally radially and axially outward direction to provide a flange 28 which is formed with a return bent edge reinforcing portion 28a.

Means for retaining the cover member 23 upon the wheel comprises a plurality of resilient retaining clips 29 which are secured to one of the wheel members, preferably the tire rim 11. For this purpose the clips 29 of substantial width are each provided with a base flange portion 30 secured as by means of a rivet 31 to the base flange 14 of the tire rim within one of the respective ventilation openings 20. An offsetting shoulder 32 formed in the clip body rests nestingly against the shoulder provided between the base flange 14 and the side flange 15 of the tire rim. This serves the purpose not only of retaining the clip against tilting about the axis of the rivet 31 but also affords a backing for the clip which renders it more resiliently resistive or stiffer in use.

From the shoulder 32 the offset clip body extends axially outwardly to a rounded resilient juncture with a generally radially inwardly and axially inwardly extending oblique cam flange 33 which terminates in a radially outwardly and axially inwardly extending oblique engagement flange 34 arranged to provide a retaining shoulder to bear against the marginal flange 28 of the inner cover member 23 and hold the same releasably against the wheel body.

In order to afford an interengagement between the cover 23 and the respective retaining clips 29 which will retain the cover against relative rotation, the outer flange portion 28 of the inner cover margin is formed with respective notches 35 within which the retaining shoulder flange 24 of each of the respective clips is adapted to engage. The inner edge defining each of the notches 35 is preferably reinforced by turning back the notched out flange portion 37 to provide a finished edge and reinforcement.

In assembling the inner cover member 23 on the wheel, it is simply pressed axially inwardly with the notches 35 registering with the retaining clips 29 and the margin of the cover camingly engaging the cam flanges 33 of the clips. After the margin of the cover has passed the noselike juncture between the cam flanges 33 and the retaining flanges 34 of the clips, the latter snap into retaining engagement with the reinforced edges 37 within the marginal notches 35 in the cover. It will be observed from Figure 3, that the relationship of the spring clips 29 to the margin of the cover portion 23 is such that the retaining force of the clips is directed through the retaining flanges 34 resiliently generally radially and axially inwardly against the margin of the cover to press the margin of the cover into the groove 25 of the wheel body.

Figure 3:
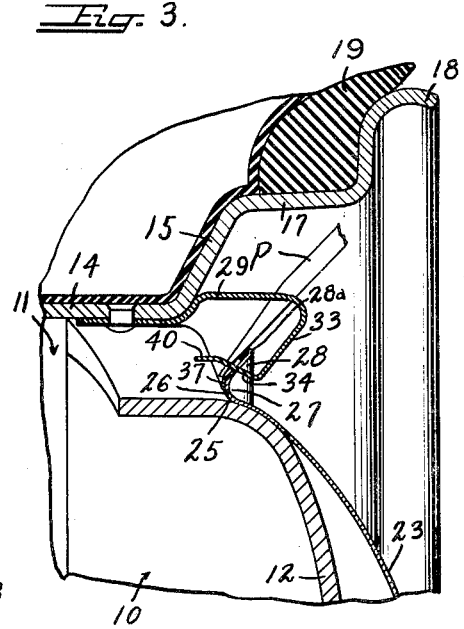
Figure 3 is a radial sectional view similar to Figure 2 but showing one of the cover members removed.

When it is desired to remove the inner cover member 23 from the wheel, a pry-off tool P is applied behind the reinforced outer marginal flange 28 and manipulated to work the margin of the cover free from the respective retaining clips 29 (Fig. 3).

Figure 1:
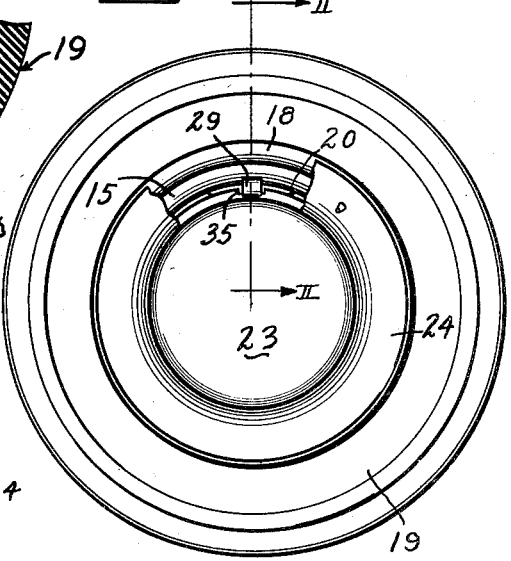
Figure 1 is a side elevational view of a wheel structure and cover assembly with a portion of the cover assembly broken away to reveal structural details therebehind.

The outer cover member 24 is preferably formed of a magnitude and extent to conceal the outer side of the tire rim 11 and to join the outer margin of the inner cover member 23 to provide in assembly what appears to be a unitary cover having divergent inner and outer portions. To this end, as best seen in Figs. 1 and 2, the other cover member has the radially outer margin thereof turned back upon itself to provide a reinforcing flange 38 and is of a diameter to extend to within a closely spaced relation to the radially inner side of the extremity of the tire rim terminal flange 18 of the tire rim. Thereby, the reinforced edge 38 lies protectively within the plane of the outer edge of the tire rim extremity flange.

From its outer margin, the cover member 24 extends generally radially and axially inwardly on a preferably convex curvature generally simulating the side wall curvature of the tire 19 and, where colored white, simulating an inner white side wall extension of the tire rim. At its inner margin, the cover member 24 is formed with a radially outwardly turned reinforcing bead 39 which is so dimensioned that it is nestingly received within the groove 27 of the inner cover margin. Furthermore, the bead 39 is of sufficient diameter to extend axially outwardly beyond the reinforced notch edges 37 and engage behind the retaining flanges 34 of the retaining clips which are thereby stressed into retaining engagement with the bead for holding the outer cover member firmly seated within the groove 27 of the inner cover member and thereby also firmly retaining the inner cover member in place.

From this it will be apparent that the cover members 23 and 24 are firmly and positively held in assembly on the wheel and by reason of the groove formation 25 in the wheel body and the relationship of the retaining clips 29 thereto, the cover members are positively held concentric with the wheel as well as positively assembled therewith. The outer cover member 24 is held against displacement eccentrically relative to the inner cover member 23 by reason of the groove formation 27 of the inner cover member.

When it becomes desirable to remove the outer cover member 24 it may be pried out of engagement with the retaining clips 29 either by applying a pry-off tool P' between the outer edge of the cover and the terminal flange 18 of the tire rim or by applying a pry-off tool P'' between the area of the inner cover member 23 adjacent to the groove 27 and the bead 39. In the later pry-off the area of the inner cover member 23 engaged by the tool P'' is thoroughly backed by the engagement of such cover area with the radially outer side of the nose bulge 12 of the wheel body and is thereby saved from indentation or distortion as might result from the manipulations of the pry-off tool.

In order to facilitate the action of the retaining spring clips 29 and to avoid any possibility of the catching of the ends of the respective retaining flanges 34 of the clips on the edge of the inner cover member at the respective slots 35, the retaining flanges 34 are preferably formed with generally axially inwardly extending terminal portions or stop flanges 40. These terminal flanges 40 are particularly advantageous in the initial application in the inner cover member 23 to the wheel and at which time one edge of the cover might possibly be applied canted off center until the remainder of the cover is seated against the wheel and centered. At such time the terminal flanges 40 will act as stops engaging the edge of the cover and preventing the respective retaining flange 34 from riding beyond the edge defined by the slot 35 within which the retaining flange is engaged.

Figure 4:
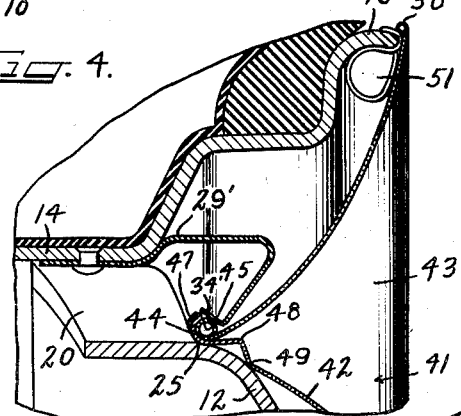
Figure 4 is a radial sectional view similar to Figure 2 but showing a slightly modified form of cover assembly.

In the modified construction shown in Figure 4, the structure of the wheel may be identical with the form of the invention shown in Figures 1 and 2, but the cover assembly may be slightly modified. The modified cover identified generally by the numeral 41 comprises an inner hub cap simulating cover member 42 and an outer annular cover member or trim ring 43. The inner cover member 42 is formed at its margin with a generally axially outwardly opening groove defined by a generally axially inwardly projecting annular rib 44. This provides a seat for the inner margin of the trim ring cover member 43 which is formed with a generally radially outwardly extending reinforcing bead 45 dimensioned to seat snugly in concentric relation within the groove of the inner cover member.

The outer extremity of the groove margin of the inner cover member is preferably turned back upon itself, providing a reinforcing flange 47 against the edge of which the retaining flanges 34' of retaining clips 29', in essential respect similar to the retaining clip 29 previously described, are adapted to engage and hold the rib 44 of the inner cover member 42 centered in assembled relation within the groove 25 provided in the wheel body prior to assembly of the outer cover member 43.

Radially inwardly from the groove rib 45, the area of the inner cover member 42 is preferably formed to provide a generally radially outwardly and axially outwardly extending reinforcing and stiffening annular rib 48, the peak of which lies in spaced relation to the adjacent portion of the outer cover member 43. The radially outward extent of the rib 48 is less than the extreme diameter of the inner edge of the outer cover member 43 so that the latter will clear the same freely for snap-on pry-off assembly relative to the retaining clips 29'. The radially inner side of the rib 48 converges with the body of the inner cover member 42 and at the convergence forms a reinforcing rib 49 resting against the radially outer side of the nose bulge 12. Thereby, the reinforcing rib 48 provides a convenient and stiff fulcrum for the application of a pry-off tool for detaching the outer cover member when it is desired to remove the same.

The outer cover member 43 may be of a magnitude and extent to cover the outer side of the tire rim 11 completely. The radially outer margin of the cover member 43 therefor may extend beyond the terminal flange 18 of the tire rim and has its outer edge reinforced as by means of a reinforcing bead 50 adapted to encompass the extremity of the terminal flange 18. In this manner the outer margin of the outer cover member 43 is adapted to conceal entirely the terminal flange 18 of the tire rim and also any wheel weight 51 that may be applied thereto.

In either form of the cover disclosed, it will be apparent that where it is desired to utilize merely the outer or trim ring cover member, that may readily be accomplished by applying the outer cover member to the spring clips without the inner cover member. In such instance, the outer side of the tire rim and the ventilation openings 20 in the wheel will be entirely concealed. On the other hand when the inner hub cap simulating member is in place and the trim ring cover member is also assembled therewith, it will be readily apparent that the hub cap simulating cover member will be quite thoroughly held against any displacing forces that may be applied thereto since the retaining clips quite thoroughly hold the inner edge of the outer cover or trim ring member against the outer margin of the inner cover member under substantial tension, which is increased when the outer cover member is applied.

Furthermore, by making the cover in two parts, the inner cover member is adapted to be formed as a stamping and the outer or trim ring cover member is adapted to be formed from a rolled section having the split ends thereof united by welding or the like and polished off smooth. This substantially reduces the cost of the complete cover. Furthermore should any part of the cover become damaged, it can be readily replaced at low cost without the necessity for replacing the entire cover.

I claim as my invention:

1. A wheel structure including multi-flange tire rim and wheel body members, one of the wheel members having resilient cover retaining means thereon, the wheel body member having an annular groove adjacent to the juncture with the tire rim member, and a cover assembly comprising an inner circular cover member having a radially outer marginal portion thereof formed to provide a generally radially outwardly and axially outwardly opening groove and a coincident generally axially inwardly extending annular rib seated in the groove of the wheel body with the adjacent radially inner portion of said outer marginal portion of the inner cover member resting against the wheel body, and an outer cover member for concealing the tire rim and having an inner marginal rearwardly turned bead seated in said groove of the inner cover member and engaged by the retaining means on the wheel to hold the cover members in assembly, said inner cover member in and adjacent to said groove being free of any retaining engagement with said bead so that the inner cover member is held in the assembly solely by snap-on, pry-off engagement with said resilient cover-retaining means, said radially inner area of the outer margin of the inner wheel-body-engaging cover member serving as a pry-off fulcrum for a pry-off tool employed to detach the outer cover member.

2. In a wheel structure including body and tire rim parts and cover-retaining spring clips on one of said parts adjacent juncture of the parts, said clips having generally radially inwardly directed resilient retaining portions, a composite cover assembly including an outer cover member, an inner circular cover member formed with a groove to receive a flange portion of the outer cover member in assembly, the inner cover member being formed with a pry-off flange extending generally radially outwardly beyond the groove, said pry-off flange being formed with notches for receiving said resilient retaining portions of the spring clips for retaining the cover members in assembly and for holding at least the inner cover member against rotation.

3. In a wheel structure including a tire rim and a load sustaining body part, the body part having ventilation openings at the juncture with the tire rim, an annular groove in the body part substantially coincident with the radially inner sides of the ventilation openings, and a composite cover for the outer side of the wheel including an inner circular cover member and an outer annular cover member, the inner circular cover member having a generally axially inwardly projecting annular rib at its margin seating within said groove in the wheel body, and the annular cover member having its inner margin seated within the groove formed by said rib in the margin of the inner cover member, the marginal extremity of the inner cover member beyond said groove-forming rib being formed with notches, and the wheel being provided with retaining clips engaging within said notches and against the inner margin of the annular cover member within the groove in the inner cover member for retaining the cover members assembled on the wheel.

4. In a wheel structure including a tire rim and a load sustaining body part, the body part having ventilation openings at the juncture with the tire rim, an annular groove in the body part substantially coincident with the radially inner sides of the ventilation openings, the radially inner side of said groove being defined by a radially and axially outwardly facing shoulder on the wheel body part, and a composite cover for the outer side of the wheel including an inner circular cover member and an outer annular cover member, the inner circular cover member having a generally axially inwardly projecting annular rib at its margin seating within said groove in the wheel body and a portion at the radially inner side of the rib seating on said wheel body shoulder, and the annular cover member having its inner margin seated within the groove formed by said rib in the margin of the inner cover member and clear of said shoulder-seating portion thereof to accommodate a pry-off tool fulcrumed against said portion.

5. In a wheel structure including a tire rim and a load sustaining body part, the body part having wheel openings at the juncture of the body part with the tire rim, the body part also having an annular groove substantially coincident with the inner sides of the wheel openings, a composite cover including an inner cover member having a generally axially inwardly extending annular rib at its margin defining an axially outwardly opening groove and seating within said groove in the body part, an outer trim ring cover member having its inner edge seated within the groove in the inner cover member, and retaining clips carried by one of said wheel parts engaging the inner marginal portion of the outer cover member and pressing the same into the groove in the inner cover member and thereby into the groove in the wheel body to retain the cover assembly on the wheel, the wheel body having a shoulder at the radially inner side of said groove therein and the inner cover member having a pry-off tool fulcrum shoulder disposed radially inwardly of the groove therein clear of the outer cover member and resting against said body shoulder.

6. In a wheel structure including a tire rim and a load sustaining body part, the body part having wheel openings at the juncture of the body part with the tire rim, the body part also having an annular groove substantially coincident with the inner sides of the wheel openings, a composite cover including an inner cover member having a generally axially inwardly extending annular rib at its margin defining an axially outwardly opening groove and seating within said groove in the body part, and an outer trim ring cover member having its inner edge seated within the groove in the inner cover member, and retaining clips carried by one of said wheel parts engaging the inner marginal portion of the outer cover member and pressing the same into the groove in the inner cover member and thereby into the groove in the wheel body to retain the cover assembly on the wheel, the margin of the inner cover member radially outwardly beyond said groove therein providing a reinforced flange having notches therein receptive of said clips and interengageable with the clips to retain the inner cover member against relative rotation on the wheel.

7. In a wheel structure including a tire rim and a load sustaining body part, the body part having wheel openings at the juncture of the body part with the tire rim, the body part also having an annular groove substantially coincident with the inner sides of the wheel openings, a composite cover including an inner cover member having a generally axially inwardly extending annular rib at its margin defining an axially outwardly opening groove and seating within said groove in the body part, and an outer trim ring cover member having its inner edge seated within the groove in the inner cover member, and retaining clips carried by one of said wheel parts engaging the inner marginal portion of the outer cover member and pressing the same into the groove in the inner cover member and thereby into the groove in the wheel body to retain the cover assembly on the wheel, the inner cover member having an annular rib projecting generally axially outwardly adjacent to said groove in the margin of the inner cover member and in radially inwardly spaced relation to the inner marginal portion of the outer cover member to provide a fulcrum for a pry-off tool for prying the outer cover member free from the assembly.

8. In a wheel structure including cover-retaining means, a wheel cover assembly including an inner hub cap simulating cover member releasably retained on the wheel by said retaining means and having an outer marginal generally axially inwardly extending annular rib defining a generally axially outwardly opening groove for receiving a trim ring cover member having the inner margin thereof seating within said groove, and a generally axially outwardly extending annular fulcrum rib formed to project outwardly from the general plane of the area of the inner cover member adjacent to said groove but spaced substantially from the bottom of the groove so as to be clear of the outer cover member when the latter has its inner edge seated within said groove.

9. In a wheel structure of the character described, including a tire rim and a wheel body, a series of retaining clips carried by one of said wheel parts, a cover member concealing a portion of the body part and having the edge thereof formed with a flange extending generally radially and axially outwardly and having a plurality of notches therein receptive of the retaining portions of the clips, the retaining clips having underturned retaining loops with respective free engagement flanges disposed to engage within said notches and press against the edge of the cover defining the inner edges of the notches and holding the cover member against the wheel body, the engagement flanges of the clips being formed with stop flange terminal portions to prevent the engagement flanges from overriding said cover flange.

10. In combination in a wheel and cover assembly, the wheel including tire rim and body portions, the body portion including an annular reinforcing axially outwardly projecting nose bulge, the cover comprising an assembly of an outer annular trim ring member and an inner circular member, the trim ring member being of a magnitude and extent to substantially conceal the tire rim and extending generally radially and axially inwardly to the radially outer side of the nose bulge, the radially inner margin of the trim ring member being formed with an underturned reinforcing bead, the radially outer margin of the inner cover member being formed with an axially outwardly opening groove within which said bead is internested, the portion of said inner cover member radially inwardly and axially outwardly spaced from the adjacent inner margin of the trim ring member resting against the radially outer side of the nose bulge, and retaining clip means on one of said portions and retainingly engaging said bead to clamp the cover members releasably together and against the wheel body portion, said trim ring cover member being separable from said retaining clips and said inner cover member by the application of a pry-off tool behind said bead and fulcrumed against said portion of the inner cover member resting against the nose bulge.

11. In a wheel structure including a tire rim and a load sustaining body part with the tire rim and body part defining a relatively wide axially outwardly opening groove therebetween, a cover assembly including a trim ring member of generally convex cross-section having its outer edge adjacent to but spaced both radially inwardly from and slightly axially inwardly relative to the extremity of the terminal flange of the tire rim, the radially inner portion of the trim ring extending closely adjacent to the wheel body, resilient spring clips on the wheel structure behind and concealed by said trim ring and engaging said radially inner portion in snap-on pry-off relation, and a circular inner cover member assembled in freely axially separable relation with the radially inner margin of the trim ring and retained thereby in clamped assembly with the wheel body, the radially outer edge of the trim ring being engageable by a pry-off tool interposed there-between and the terminal flange extremity and fulcrumed against the terminal flange extremity to pry the trim ring free from said clips and thus from the wheel and said inner cover member, said inner cover member having radially outwardly extending flange means behind the trim ring and engageable by said spring clips and retained thereby in position on the wheel when the trim ring is pried free from the wheel.

GEORGE ALBERT LYON.

REFERENCES CITED

The following references are of record in the file of this patent:

UNITED STATES PATENTS

| Number | Name | Date |
| --- | --- | --- |
| Re. 21,179 | Lyon | Aug. 22, 1939 |
| 2,190,669 | Lyon | Feb. 20, 1940 |
| 2,368,230 | Lyon | Jan. 30, 1945 |
| 2,368,245 | Lyon | Jan. 30, 1945 |
| 2,383,071 | Mulhern | Aug. 21, 1945 |
| 2,386,232 | Lyon | Oct. 9, 1945 |
| 2,386,236 | Lyon | Oct. 9, 1945 |
| 2,397,024 | Lyon | Mar. 19, 1946 |